United States Patent [19]

Kohut

[11] Patent Number: 4,926,536
[45] Date of Patent: May 22, 1990

[54] APPARATUS FOR REPLACING A DOOR PANEL

[76] Inventor: Frank R. Kohut, 107 Columbus St., Bloomfield, N.J. 07003

[21] Appl. No.: 353,845

[22] Filed: May 17, 1989

Related U.S. Application Data

[63] Continuation-in-part of Ser. No. 248,452, Sep. 23, 1988.

[51] Int. Cl.[5] ............................................. B23P 11/00
[52] U.S. Cl. .................................. 29/238; 29/243.58; 29/278; 72/409; 72/458; 72/479; 81/129
[58] Field of Search ................ 81/129; 29/238, 243.5, 29/243.57, 243.58, 278, 402.03, 402.08, 402.13, 426.4; 72/409, 457, 458, 479; 49/502

[56] References Cited

U.S. PATENT DOCUMENTS

| | | | |
|---|---|---|---|
| 2,436,278 | 2/1948 | Willett | 29/243.57 |
| 3,421,356 | 1/1969 | Buske | 29/243.58 X |
| 3,477,272 | 11/1969 | Hunter | 29/243.58 X |
| 3,602,032 | 8/1971 | Skintzis | 29/243.58 X |
| 4,376,385 | 3/1983 | Davis | 72/479 |
| 4,706,489 | 11/1987 | Dacey, Jr. | 29/243.58 X |

Primary Examiner—Timothy V. Eley
Assistant Examiner—Frances Chin
Attorney, Agent, or Firm—Blum Kaplan

[57] ABSTRACT

A method for replacing an automobile door panel without removing the door from the automobile utilizing a crimping tool is provided. The mirror is removed from the door. An inner section of the damaged door panel is cut out leaving a border around the door frame. The cut out inner section is removed and the handle and lock cylinder on the door are also removed. A plurality of relief cuts are made about the front, bottom and rear surfaces of the border remaining on the door frame. The border is then peeled away from the door frame. A new panel is placed around the front edge of the door frame holding the back end out. The panel is then pushed in and around the remainder of the door frame. The back and the bottom edges of the new panel are then crimped with a hammer and dolly block and the front edge of the door panel is crimped about the door frame with a tool having a dolly block and a guide formed therein, a handle mounted on the dolly block, a pad mounted on the dolly block and a crimper slidably disposed within the guide. The remaining edges of the panel are then welded.

10 Claims, 4 Drawing Sheets

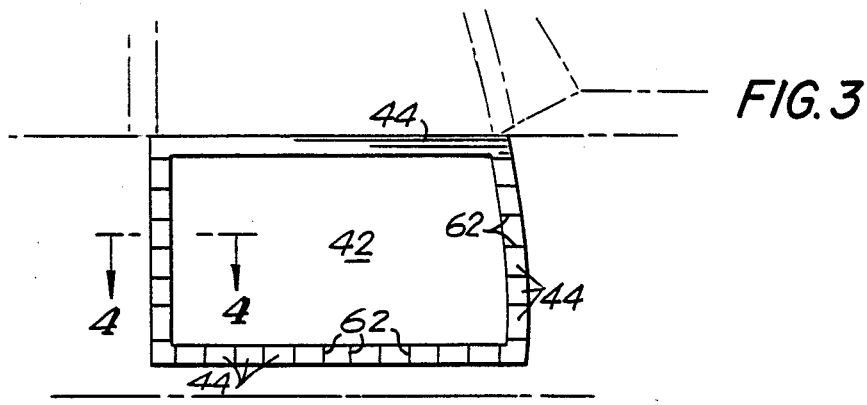
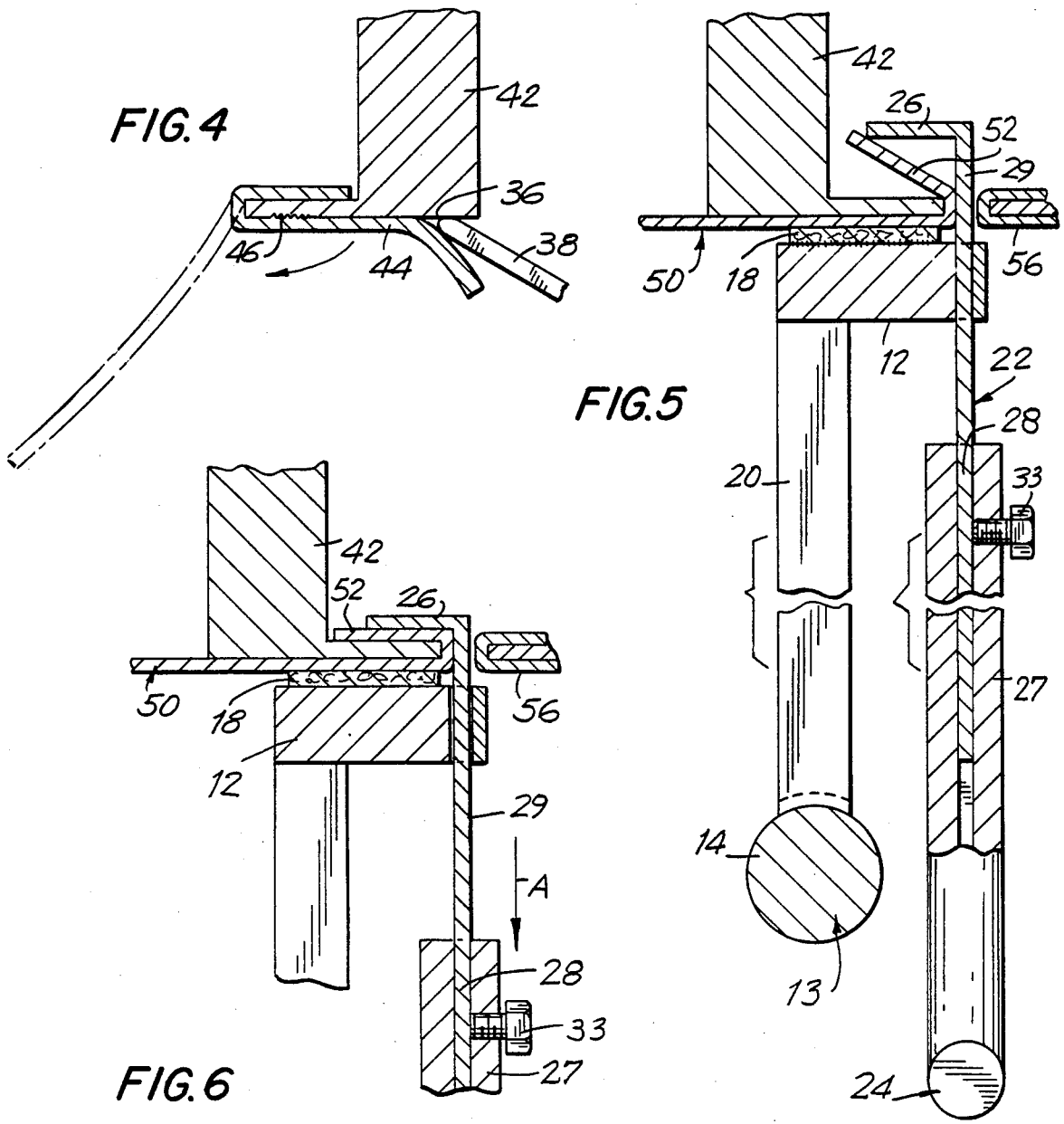

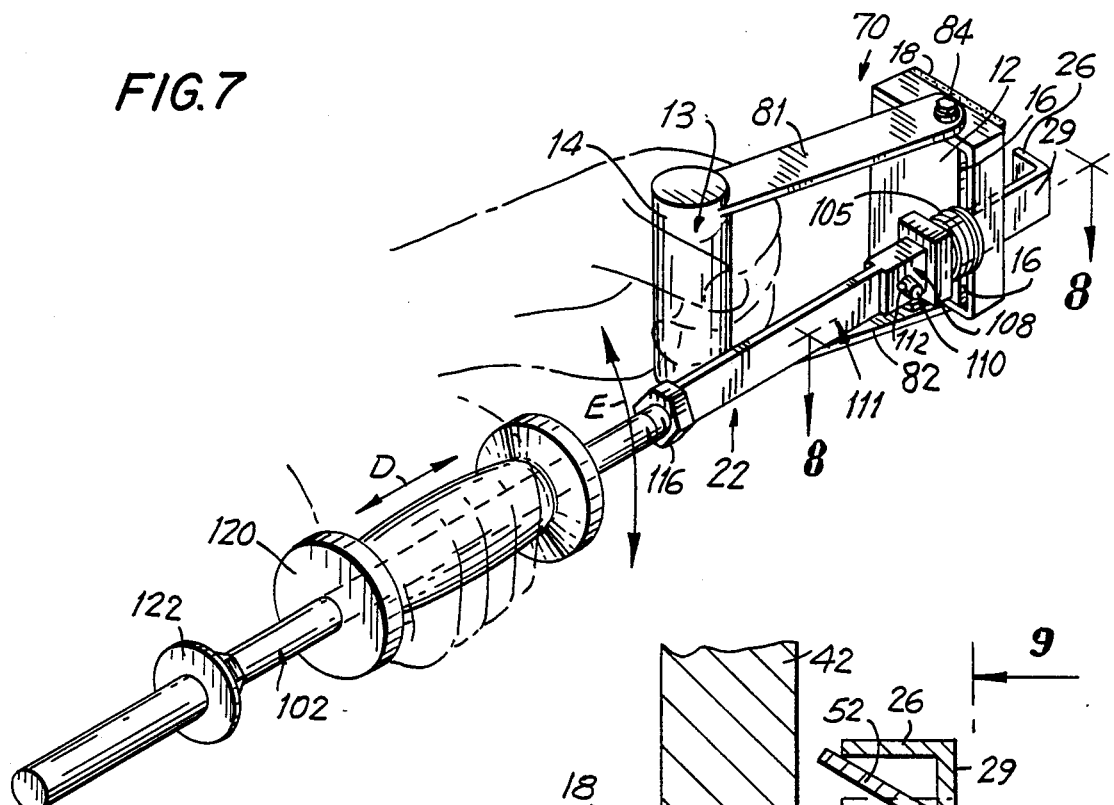
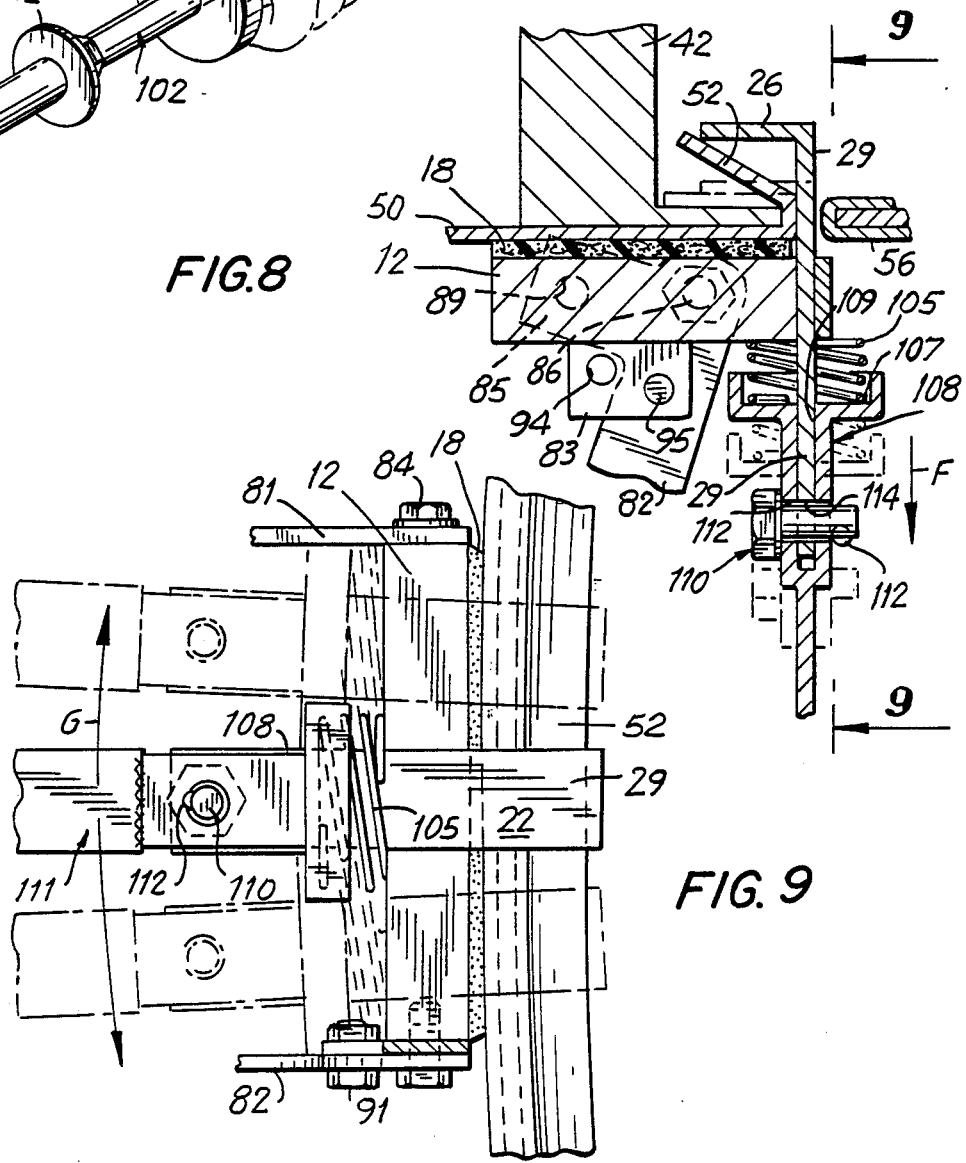

APPARATUS FOR REPLACING A DOOR PANEL

CROSS REFERENCE TO RELATED PATENTS

This is a continuation-in-part of U.S. patent application No. 07/248,452, filed Sept. 23, 1988.

BACKGROUND OF THE INVENTION

This invention is directed to an apparatus for replacing a door panel on an automobile door and a method for replacing the door panel utilizing the apparatus, and in particular, an apparatus and method for replacing a door panel without removing the door.

Door panels are conventionally replaced by removing the entire door including the panel and frame from an automobile and by further removing the panel from the door after the door has been removed from the automobile. This method of door panel replacement has been less than satisfactory. Removing a door panel with conventional tools in a conventional manner requires a considerable amount of time to remove the entire door and replace the entire door after the door panel has been replaced. Furthermore, upon replacing the door, the door must be realigned with the automobile again requiring additional time and often resulting in less than perfect alignment making opening and closing of the door more difficult.

Accordingly, it is desired to provide a method for replacing a door panel without removing the door from the automobile and specific improved tool for allowing such a method to be accomplished.

SUMMARY OF THE INVENTION

Generally, a crimper tool for replacing a door panel without necessitating the removal of the door from the automobile and a method for utilizing the tool is provided. The tool includes a dolly block having a slot therein. A dolly block handle is secured on the dolly block. A cushioning pad that is adapted to be brought into contact with the door panel is also provided on the dolly block. A crimper extends through the slot and is slidably positioned therein. A handle is affixed to the crimper to aid in positioning the crimper during crimping of the door panel. The handle may be formed as either a "T" shaped handle affixed to the crimper or as a sliding handle slidably mounted to the crimper.

A peel away tool may be utilized to peel away the door panel from the door frame. The tool includes a stem that is releasably inserted into a pneumatic air cutter. A blade section having a planar surface substantially thinner than the shaft and a rounded blunt front lateral surface extends from the shaft.

Also, a modified forked air chisel is provided to facilitate providing relief cuts in the original door panel. The relief cuts in the door panel are part of the labor saving method of the instant invention.

The method of replacing a door panel includes the steps of first removing the mirror and removing the door belt molding. An inner section of the damaged door panel is cut away from the door leaving a two inch border about the door circumference. The handle and lock cylinder are removed. Relief cuts, approximately three inches apart, are made around the front, bottom and rear sections of the remaining border by utilizing the modified forked air chisel. The modified peeling tool is utilized in a pneumatic air cutter to remove the old door panel border from the door frame by wedging the blunted front edge between the door frame and door panel.

The new panel is prepared to be placed on the frame. The new panel is installed around the front edge of the door frame holding the back end out. Initially the lip at the front edge of the door panel is hammered using a hammer and body spoon to approximately a 30° angle or less. The panel is then pushed in around the rear edge of the door frame. The back and bottom edges of the new panel are crimped and the door is closed to check alignment. When the panel is aligned the panel is spot welded in the rear and bottom to hold the panel in the aligned position. The crimper is then slid between the open door and front fender. The door is then closed and the front edge of the door panel is crimped using the crimper tool of the instant invention. Thereafter, the mirror and belt molding are then reinstalled to complete replacement.

Accordingly, it is an object of the invention to provide improved tools for replacing door panels.

Yet another object of the invention is to provide a method for replacing door panels on a car which does not necessitate the removal of the entire door from the car body during the replacement method.

Still another object of the instant invention is to provide tools for replacing a car door panel and a method for utilizing the tool which reduces the time required to replace a door panel.

A further object of the instant invention is to provide door panel replacement tools and a door panel replacement method which eliminates the need to remove the door from the car during replacement of the door panel.

Yet another object of the invention is to provide door panel replacement tools and a door panel replacement method which allows the peeling off of the entire door skin while the door is affixed to the automobile.

Still another object of the invention is to provide a door panel replacement tool and door panel replacement method which allows the replacement of the door skin without removing the door from the automobile.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a front elevational view of the damaged door panel during an intermediate step of the process for replacing the door panel;

FIG. 4 is a sectional view along line 4—4 of FIG. 3 of the damaged door panel being peeled by the peeling tool;

FIG. 5 is a sectional view of the new door panel being crimped by the door panel edge crimper; and FIG. 6 is a sectional view of the new door panel after crimping by the door panel edge crimper has been completed;

FIG. 7 is a perspective view of a second embodiment of a door panel edge crimper constructed in accordance with the invention;

FIG. 8 is a sectional view along line 8—8 of the new door panel being crimped by the door panel edge crimper of FIG. 7; and FIG. 9 is a side elevational view taken along line 9—9 of FIG. 8 of the door panel being crimped by the door panel edge crimper of FIG. 7;

DETAILED DESCRIPTION OF THE PREFERRED EMBODIMENTS

Figure 1:
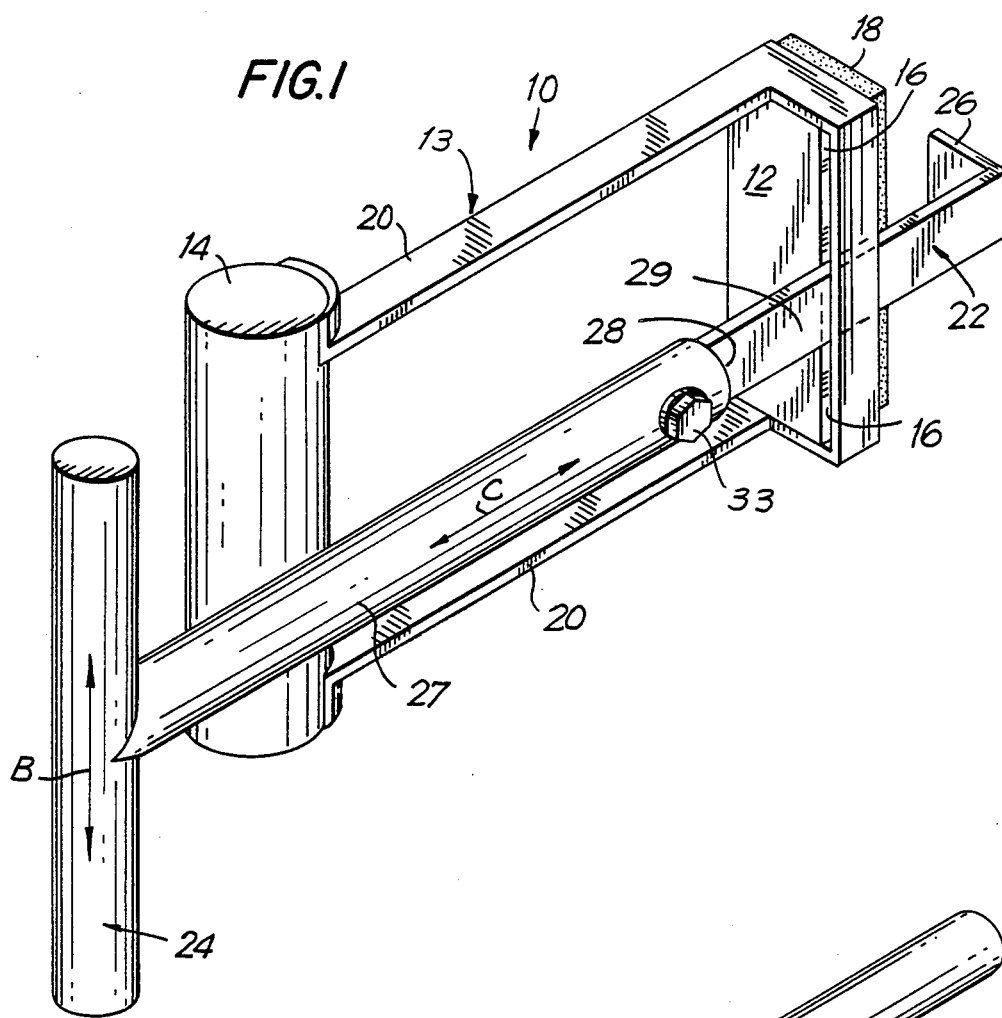
FIG. 1 is a perspective view of a door panel edge crimper constructed in accordance with the invention.

Reference is made to FIG. 1 wherein a door panel edge crimper, generally indicated at 10, constructed in accordance with the invention is provided. Door panel edge crimper 10 includes a dolly block 12 having a slot 16 formed therein. A handle assembly generally indicated as 13 includes a handle 14 affixed to dolly block 12 in spaced relation by support arms 20 located at either side of dolly block 12. A pad 18 is provided on dolly block 12 so that when dolly block 12 comes in contact with an automobile panel, the pressures exerted by dolly block 12 do not deform the door or panel being worked upon. Pad 18 may be made of leather or some other cushioning material.

A crimper generally indicated as 22 is slidably disposed within slot 16 so that slot 16 acts as a guide therefor. Crimper 22 moves in the direction of arrows C. A "T" shaped slide handle 24 includes shaft 27, which is affixed at the non-crimping end 28 of crimper bar 29 by a screw 33 to provide leverage during crimping and to aid in the manipulation of crimper bar 29. Crimper bar 29 includes a flanged crimping end 26 formed of a solid piece of metal or the like formed as a right angle to the lengthwise extent of shaft 27 and crimper bar 29.

Reference is made to FIGS. 5 and 6 wherein the operation of crimper 10 is depicted. During crimping, dolly block 12 is positioned against a new door panel 50 being installed adjacent to the edge of the door panel being crimped about a door frame 42. For example, when crimping the front edge of front door panel 50, crimping end 26 is slid between the open door and the adjacent door surface; such as the rear of a fender 56. Slide handle 24 is then pulled causing crimping end 26 to move towards dolly block 12 in the direction of arrow A crimping the new panel edge 52 about door frame 42. Contours can also be crimped by angling the action of slide handle 24 in the direction of arrows B. Crimping end 26 is dimensioned to crimp an area approximately the width of crimping end 26 during each crimping action. Dolly block 12 is then moved to the next three inch area to be crimped.

Figure 2:
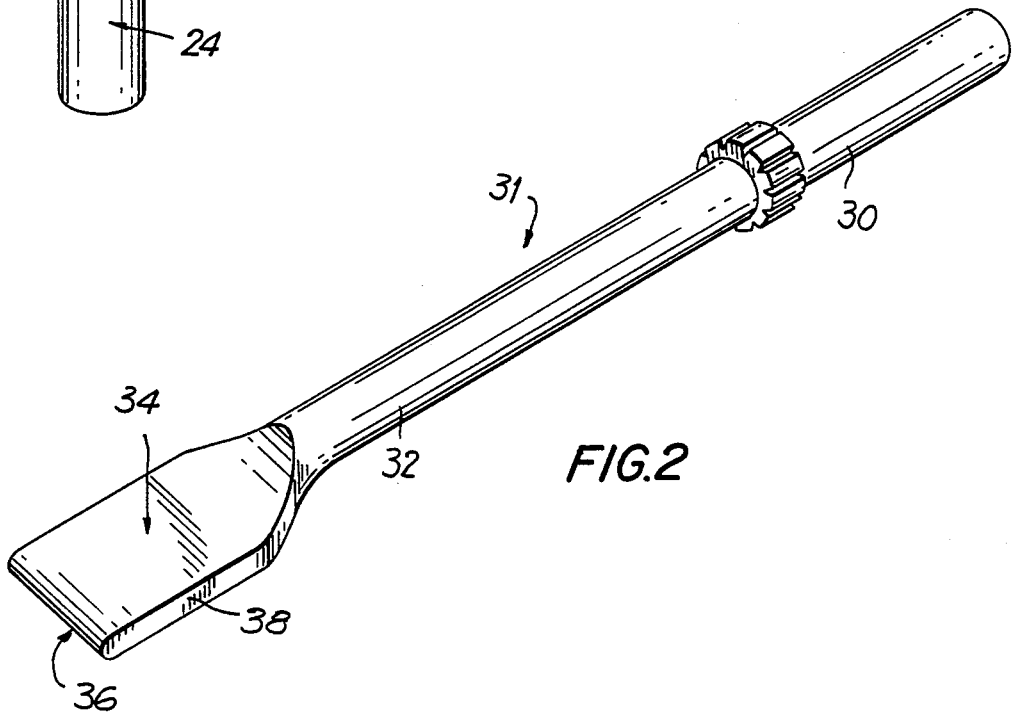
FIG. 2 is a perspective view of a peeling tool for use in an air chisel constructed in accordance with the invention.

Reference is now made to FIG. 2 in which a peeling tool, generally indicated at 31, constructed in accordance with the invention is provided. Peeling tool 31 includes a stem 30 that is received in an air chisel which is pneumatically driven (not shown). A blade portion 34 extends from a shaft 32 and includes a substantially planar section 38 having a width substantially smaller than handle 32 and a blunt rounded surface 36.

Peel away tool 31 is utilized to remove the remaining border of the door panel once the door panel has been cut away from the border during removal of the door panel. As seen in FIG. 4, tool 31 includes a blade portion 34 that includes a blunt rounded surface. By using a blunt rounded surface 36 in lieu of a more conventional tool having a sharp edge formed by two converging planar surfaces, when the rounded surface 36 is wedged between door frame 42 and the remaining border 44 of the old door panel it will facilitate breaking welds. Specifically, stem 30 of tool 31 is fitted in an air chisel and the blunt surface 36 causes the welds 46 between the old door panel 44 and door frame 42 to be easily broken, hence, separating the remaining panel border 44 from door frame 42.

Reference is also made to FIGS. 7-9 wherein a second embodiment of the door panel crimper generally indicated at 70, and constructed in accordance with the invention is depicted. Like numerals are used to indicate like structure described above. The difference between crimper 70 and crimper 10 is the replacement of a "T" shaped handle with a sliding handle and the ability to pivot the handle assembly 13 for ease of use by a right handed person or a left handed person. As depicted in FIG. 7, door panel crimper 70 is disposed for use by a right handed person to repair the front and rear panels of the passenger side of the car (FIG. 3) or by a left handed person to repair the front and rear door panels on the drivers side of the car. In particular, door panel edge crimper 70 includes dolly block 12 having a slot 16 formed therein. Handle assembly 13 extends from dolly block 12 and a pad 18 is provided on the surface of dolly block 12 facing the car door panel.

Figure 10:
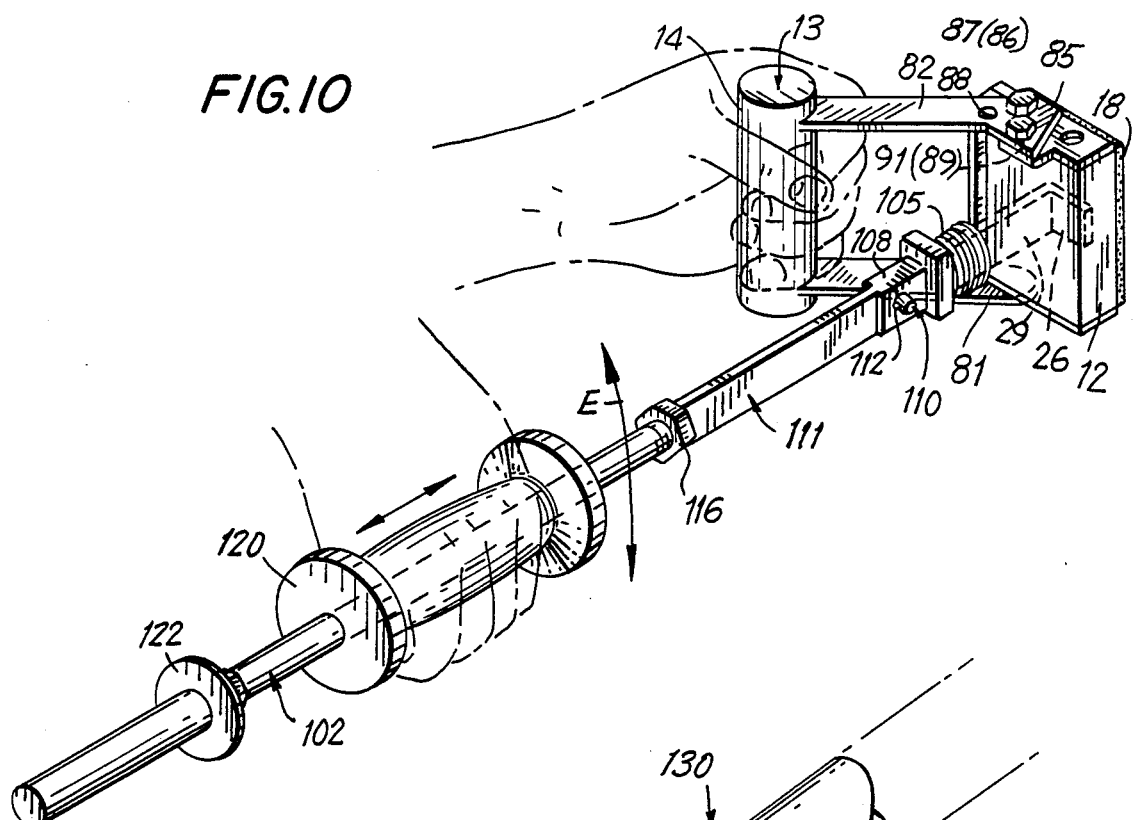
FIG. 10 is a perspective view of the door panel edge crimper depicted in FIG. 7 with the handle reoriented in accordance with the instant invention.

Handle assembly 13 includes handle 14 and opposed struts 81 and 82 projecting from handle 14. Strut 81 is pivotally secured to block 12 by a pivot pin 84 that is disposed in an opening (not shown) in the strut. Referring specifically to FIGS. 8 and 10, block 12 includes an integrally formed plate 83 projecting therefrom, which includes positioning openings 94 and 95. Strut 82 includes an L-shaped end 85 (FIG. 10) which includes a first opening 86 which receives therein a pivot pin 87 for pivotably securing strut 82 to block 12. Second and third positioning openings 88 and 89 are also disposed in L-shaped end 85.

When tool 70 is to be used by a right handed person on the passenger side of the car, in the manner discussed more particularly below, handle assembly 13 is oriented with respect to block 12 in the manner depicted in FIG. 7. Specifically, a pivot locking pin 91 is disposed in position opening 88 in end 85 and opening 95 in plate 83. However, when tool 70 is to be used between the left side of the front door panel and the fender on the driver's side of the car by a right handed person, pivot locking pin 91 can be removed from openings 95 and 88. Handle assembly 13 is then pivoted about block 12 and locking pin 91 is reinserted within opening 89 in the L-shaped end 85 and opening 94 in plate 83 to reposition the handle assembly 13 and crimping end 26 in the manner depicted in FIG. 10. The ability to reposition the handle and the crimper to adjust for the user strength is of considerable importance in reducing fatigue and expediting the replacement of a door panel in accordance with the novel method of the instant invention.

Crimper 22 includes flanged crimping end 26 and crimper bar 29 slidably disposed in slot 16 so that slot 16 acts as guide for crimper 22. Slide handle rod 102 is formed of a long steel rod having a rear stop 122 welded thereto. Thereafter, slide hammer 120 is slid onto rod 102, and front stop 116 is welded onto rod 102. Rod 102 is tapered in section 111 from its original diameter to a thinner profile to provide clearance for the user's fingers between handle assembly 13 and tapered section 111. At the end of the tapered section 111 is a spring retaining wall and sleeve assembly 108. Spring retaining wall and sleeve assembly 108 is integrally formed with tapered section 111 and forms a sleeve 109. One end of crimping bar 29 includes an opening 114 which is aligned with an opening 112 in sleeve 109 for receiving locking pin 110 to thereby secure crimping bar 29 in the spring retaining wall and sleeve assembly 108. A substantially rectangular spring retaining wall 107 is disposed at the opening of sleeve 109 and is sized for retaining and positioning therein spring 105.

Sliding handle 120 is movable in a reciprocating back and forth motion in the direction of arrows D. Accordingly, sliding handle 120 is slid forward against stop 116 moving crimping end 26 in a forward direction to be in place for crimping of the new door panel edge. Sliding handle 120 is then moved in a backward direction until it comes in contact with stop end 122. Because stop end 122 is affixed to handle rod 102, when sliding handle 120 comes in contact with stop end 122, crimping end 26 is pulled towards the user. Additionally, because sliding handle 120 is moved towards stop end 122 to cause crimping, the momentum of sliding handle 120 applies the work needed to crimp the sheet metal of the new door panel, making crimping easier for the user. Sliding handle 120 is also rotatable about handle rod 102 in the direction of arrow E allowing for movement of the hand of the user during the crimping motion.

Spring 105 prevents crimping end 26 from being moved in too great a forward direction relative to the user. Spring 105 when fully compressed limits the amount of displacement of flanged crimping end 26 and, hence, the length of the spring, when compressed, assists in optimizing the effect of the crimping tool. Also, by spring loading the crimper in relationship to the crimping tool, it is easier for the operator to effect movement of the crimping flange 26 when it is inserted between the door panel and the adjacent fender.

As depicted in FIG. 8, crimping occurs in a manner similar to the crimping of door panel edge by crimper 10. Dolly block 12 is positioned against a new door panel 50, which door panel is to be crimped about a door frame 42. When crimping the front edge of door panel 50, crimping end 26 is slid between the open door and the adjacent door surface of the fender 56. Sliding handle 120 is then slid in the direction of arrow F and is brought into contact with stop end 122 causing crimper 26 to move towards dolly block 12 in the direction of arrow F, and hence crimping the new panel edge 52 about door frame 42. Additionally, as seen in FIG. 9 the contour of the door panel can also be crimped by angling the action of crimper 22 in the direction of arrows G by pulling up or down on sliding handle 120 during use.

Figure 11:
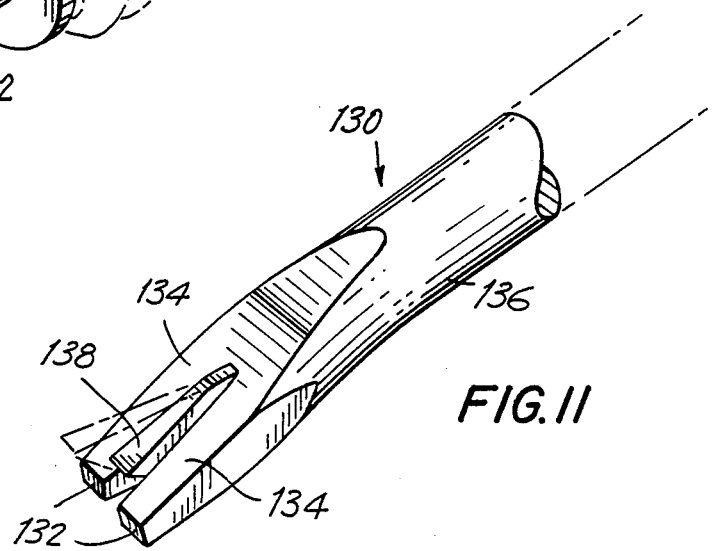
FIG. 11 is a perspective view of a modified forked air chisel constructed in accordance with the instant invention.
Figure 12:
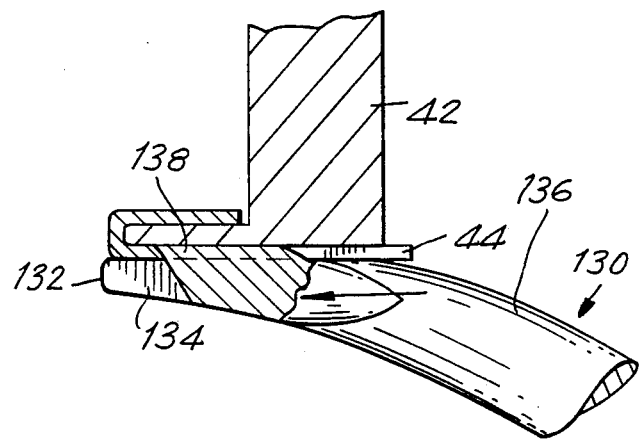
FIG. 12 is a partial sectional view of the forked air chisel depicted in FIG. 11, in operation.

Reference is now made to FIGS. 11 and 12, wherein a modified forked air chisel, generally indicated at 130 and constructed in accordance with the instant invention is depicted. Air chisel 130 includes a forked arrangement wherein the outside fingers 132 include conventional flat surfaces 134 and are angled from the shaft 136 of the chisel. Middle finger 138 is modified from a conventional forked air chisel by reducing the distance that the middle finger 138 projects from surfaces 134 to a distance that approximates the thickness of the gauge steel used in the car door panel. In a preferred embodiment, the middle finger will project outward from the surfaces 134 by no more than 0.050 inches. Moreover, in an exemplary embodiment of the instant invention, a distance of 0.045 inches has been found to be particularly effective when the sheet steel for the door panel that is to be removed is on the order of 0.036 inches.

As is illustrated in FIGS. 3 and 12, when the air chisel is used to make relief cuts 62 in the door panel, the modified middle finger prevents relief cut from being made into the steel door frame that will remain after the dented door panel to be replaced has been removed from the door frame. The benefit provided by the modified air chisel is better understood with respect to the unique method of replacing a door panel of the instant invention, which is described in detail below.

A complete method for replacing a door panel utilizing door panel edge crimper 10 or 70 and peel away tool 31 is now detailed below. First, the mirror is removed. If the mirror is a cable remote control mirror, then the interior trim must be removed before removing the mirror. However, if the mirror is electrically remote controlled and the connection is adjacent to the mirror mount, then the mirror is merely removed and unplugged. The interior door trim does not need to be removed. The door belt molding located above the door adjacent the glass pane is then removed. If the molding is held only by plastic clips, then the molding is directly removed. However, if the molding is held by screws that are screwed into the door panel upper edge, the molding is left on. The molding is later trimmed off when trimming away the upper edge of the remaining border of the panel and then unscrewed, as will be described in greater detail below. If the belt molding is screwed through the door panel into a permanent reenforcement brace, the door interior trim must be removed and the door glass either dropped down out of the way or removed in order to remove the belt molding.

As seen in FIG. 3, the damaged door panel is then trimmed by first cutting out an inner section of the old damaged door panel leaving about a two inch border 44 remaining that extends about the outer edges of door frame 42. The cutout inner section is then carefully pulled away from the door frame with one hand leaving the other hand free to disconnect the rods which connect the door handle and lock cylinder to the door. Thus, a two inch border 44 is left formed of the remnants of the damaged door panel with a hole therein formed by the removal of the damaged door panel which has been cut away. The cutout section is completely removed with the handle and lock cylinder attached. The handle and lock cylinder are detached from the old door panel and saved for the new panel. Cutting away the old door, provides access to previously hard to reach areas allowing a mechanic to work on the door frame without removing the door frame by working from the inside of the door and beneath the door panel through the access obtained by the cutout area.

Next, as shown in FIG. 3, relief cuts 62 spaced approximately three inches apart are made by modified forked air chisel 130 around the front, bottom and rear edges of the two inch border 44 remaining on door frame 42 from the old panel. Next, as shown in FIG. 4, using air chisel peel away tool 31, blunt surface 36 is forced between old door panel border 44 and door frame 42. With the aid of the relief cuts and the blunt surface 36 of the tool 31, the old door panel is peeled away from door frame 42 by breaking spot welds 46 (FIG. 4) attaching the old door panel to door frame 42. Relief cuts 62 and, in particular, the spacing thereof relieves the pressure of the entire weld by limiting the attachment force of the border to each individual spot weld 46 rather than to the force of all the spot welds acting in unison upon the entire strip. This peeling process is performed around the front, bottom and rear edges of the door and is particularly suited for removing the section of the old door panel which is next to the fender where there is very little room to work. The peeled away door sections adjacent the front fender may be cut away and dropped into the door bottom. The dropped pieces may then be removed by pliers. Once the entire door panel border has been removed the door frame edge is ready to be shaped and aligned to the front fender and the rear quarter panel or door.

To install a new panel, a new preformed panel is first prepared. The inside of the preformed panel is grounded and a thin coat of body filler is applied to act as a sound barrier. The panel is sanded and primed and the body color is dusted in around the handle and lock cylinder areas. The door handle and lock cylinder are then installed on the panel. The lip of the front edge of the new panel is preformed at a 90° angle. The lip is then bent to approximately a 30° angle or less with a body hammer and spoon prior to mounting the lip of the front edge of the new panel at the front of the door frame.

The screws at the bottom of the back edge of the front fender are removed. The fender is pulled away from the frame by wedging a two-by-four between the rocker and the fender bottom. This permits more room to install the new panel in and around the front of the door frame. The new panel is installed around the front edge of the door frame, while the back is held out, to catch the rods to the door handle and lock cylinder. The panel is then pushed in around the remainder of the door frame.

The back and bottom edges of the new panel are crimped with a hammer and dolly block. The two-by-four is removed and the fender bottom is reinstalled. The door is closed and the panel is checked for alignment. When the panel is aligned, several areas of the door panel are spot welded in the rear and bottom to hold the panel in the aligned position.

As depicted in FIGS. 5 and 6, the front edge of the new door panel 50 is then crimped, utilizing door panel edge crimper 10. Although crimper 10 is illustrated and described by way of example below, the same method can be adopted utilizing crimper 70 illustrated in FIGS. 7 through 10, with the attendant benefits noted above. Crimping end 26 is then slid between the open door and the rear of the front fender. The door is closed. The front edge of the door panel is crimped by positioning crimping end 26 about an edge 52 of new panel 50 to be crimped about door frame 42. By pulling slide handle 24 (or 120 in FIGS. 7 through 10) away from block 12, edge 52 is bent about door frame 42 thereby more permanently affixing new panel 50 to door frame 42.

The remaining parts of the door panel are then welded. The inner edge of the panel is sanded and primed and then a seam seal is applied. The mirror, belt molding and interior trim are then installed completing panel replacement.

It will thus be seen that the objects set forth above, among those made apparent from the preceding description are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A tool for crimping a door panel edge of an automobile door comprising a dolly block having a guide formed therein, handle means mounted on said dolly block, a pad mounted on said dolly block, and crimping means positioned within said guide for crimping a door panel when said pad comes in contact with a door panel adjacent to an edge to be crimped.

2. The tool of claim 1, wherein said crimping means includes a crimper slidably disposed within said guide, said crimper including a crimping end for crimping said door panel and a slide handle affixed to said crimper.

3. The tool of claim 1, wherein the pad is made of leather.

4. The tool of claim 2, wherein said slide handle is "T" shaped handle.

5. The tool of claim 2, wherein said handle includes a handle rod affixed to said crimper, a stop end affixed to said handle rod, and a sliding handle slidably and rotatable mounted about said handle rod said sliding handle being slidable toward said dolly block and away from said dolly block, said stop end preventing said slidable handle from sliding off of said handle rod.

6. The tool of claim 5, said rod including a second stop for limiting the displacement of said sliding handle towards said dolly block.

7. The tool of claim 6, said rod including spring retaining means and a spring encircling said crimping means and being retained around said crimping means between said spring retaining means and said dolly block, the distance of said spring, when compressed, defining the distance said crimping means can be displaced.

8. The tool of claim 1, wherein said handle means is pivotally mounted to said dolly block for permitting said handle means to be oriented with respect to said crimping means to permit an operator to operate said crimping means with the preferred dexterity of the operator.

9. The tool of claim 8, wherein said handle means includes a handle and two opposed struts, the opposed struts being pivotally secured at laterally opposite positions to said dolly block to permit said handle means to pivot with respect to said dolly block and releasable locking means associated with said dolly block and one of said struts for releasably locking said handle means in at least one of two orientations with respect to said crimping means.

10. The tool of claim 9, wherein said releasable locking means includes a plate means projecting from said dolly block and including first and second openings formed in said plate means, said releasable locking means further including first and second openings in said opposed strut that is adjacent to said plate means, and a releasable locking pin adapted to be inserted into said first opening in said plate means and said first opening in said first strut to releasably fixedly position said dolly block and handle means in a first orientation for user convenience, said handle means being releasably fixedly positioned with respect to said dolly block in a second orientation for user convenience when said releasable locking pin is inserted into said second opening in said first strut means and said second opening in said plate means.

* * * * *